(12) United States Patent
Kim et al.

(10) Patent No.: US 9,742,038 B2
(45) Date of Patent: Aug. 22, 2017

(54) METHOD FOR MANUFACTURING ALL SOLID ELECTRODE HAVING SOLID ELECTROLYTE CONCENTRATION GRADIENT

(71) Applicant: Hyundai Motor Company, Seoul (KR)

(72) Inventors: Dong Hui Kim, Gyeonggi-do (KR); Tae Young Kim, Gyeonggi-do (KR); Kyoung Han Ryu, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 256 days.

(21) Appl. No.: 14/569,725

(22) Filed: Dec. 14, 2014

(65) Prior Publication Data

US 2015/0340741 A1    Nov. 26, 2015

(30) Foreign Application Priority Data

May 26, 2014    (KR) ........................ 10-2014-0063211

(51) Int. Cl.
*H01M 10/0585* (2010.01)
*H01M 10/0562* (2010.01)
(Continued)

(52) U.S. Cl.
CPC ..... *H01M 10/0585* (2013.01); *H01M 4/0419* (2013.01); *H01M 4/13* (2013.01); *H01M 4/139* (2013.01); *H01M 10/0413* (2013.01); *H01M 10/0436* (2013.01); *H01M 10/0525* (2013.01); *H01M 10/0562* (2013.01);
(Continued)

(58) Field of Classification Search
CPC ......... H01M 10/0413; H01M 10/0436; H01M 10/0525; H01M 10/0562; H01M 10/0585; H01M 2004/021; H01M 4/0419; H01M 4/13; H01M 4/131; H01M 4/133; H01M 4/139; H01M 4/1391; H01M 4/1393; H01M 4/525; H01M 4/587

See application file for complete search history.

(56) References Cited

U.S. PATENT DOCUMENTS

2006/0251965 A1* 11/2006 Nagayama ............ H01M 2/021
                                                                    429/209
2011/0123866 A1*  5/2011 Pan .......................... H01M 2/16
                                                                    429/221
(Continued)

FOREIGN PATENT DOCUMENTS

JP    11-283664 A    10/1999
JP    2009-146657 A    7/2009
(Continued)

*Primary Examiner* — Carlos Barcena
(74) *Attorney, Agent, or Firm* — Mintz Levin Cohn Ferris Glovsky and Popeo, P.C.; Peter F. Corless (57) ABSTRACT

An all solid electrode structure having a solid electrolyte concentration gradient is provided and a method of improving an output performance is provided with improved ion diffusion and obtaining a high capacity battery, by disposing an anode or cathode electrode having a substantially continuous concentration gradient to have a greater solid electrolyte ratio as being closer to a solid electrolyte interface and have a greater active material ratio as being close to a current collector interface. The active material/solid electrolyte ratio of anode and cathode active material layers has a concentration gradient by a single process using an aerosol deposition method.

4 Claims, 6 Drawing Sheets

ANODE CURRENT COLLECTOR

CONCENTRATION GRADIENT ANODE ACTIVE MATERIAL LAYER (ACTIVE MATERIAL +SOLID ELECTROLYTE+CONDUCTOR)

SOLID ELECTROLYTE LAYER

CONCENTRATION GRADIENT CATHODE ACTIVE MATERIAL LAYER (ACTIVE MATERIAL +SOLID ELECTROLYTE+CONDUCTOR)

CATHODE CURRENT COLLECTOR (51) Int. Cl.
*H01M 10/04* (2006.01)
*H01M 10/0525* (2010.01)
*H01M 4/139* (2010.01)
*H01M 4/04* (2006.01)
*H01M 4/13* (2010.01)
*H01M 4/131* (2010.01)
*H01M 4/133* (2010.01)
*H01M 4/1391* (2010.01)
*H01M 4/1393* (2010.01)
*H01M 4/525* (2010.01)
*H01M 4/587* (2010.01)
*H01M 4/02* (2006.01)

(52) U.S. Cl.
CPC ............ *H01M 4/131* (2013.01); *H01M 4/133* (2013.01); *H01M 4/1391* (2013.01); *H01M 4/1393* (2013.01); *H01M 4/525* (2013.01); *H01M 4/587* (2013.01); *H01M 2004/021* (2013.01); *Y10T 29/4911* (2015.01)

(56) References Cited

U.S. PATENT DOCUMENTS

2012/0115028 A1    5/2012  Ueno et al.
2014/0038054 A1*   2/2014  Tojigamori ........... H01M 10/05
                                                      429/223

FOREIGN PATENT DOCUMENTS

| | | | |
|---|---|---|---|
| JP | 2011-124028 A | | 6/2011 |
| JP | 2011124028 A | * | 6/2011 |
| JP | 2012-104270 A | | 5/2012 |
| KR | 2012-0132533 A | | 12/2012 |
| WO | 2013-099878 A1 | | 7/2013 |

* cited by examiner

METHOD FOR MANUFACTURING ALL SOLID ELECTRODE HAVING SOLID ELECTROLYTE CONCENTRATION GRADIENT

CROSS-REFERENCE TO RELATED APPLICATION

This application claims under 35 U.S.C. §119(a) the benefit of Korean Patent Application No. 10-2014-0063211 filed on May 26, 2014, the entire contents of which are incorporated herein by reference.

TECHNICAL FIELD

The present invention relates to an all solid electrode structure having a solid electrolyte concentration gradient, and to a method of improving an output performance of the all solid electrode with improved ion diffusion and obtaining a high capacity battery, by disposing an anode or a cathode electrode having a continuous concentration gradient to have a greater solid electrolyte ratio closer to a solid electrolyte interface and have a greater active material ratio similar to a current collector interface, such that the ratio of the active material and the solid electrolyte ratio on the anode and cathode active material layers has a concentration gradient by a single process using an aerosol deposition method.

BACKGROUND

Current commercially available lithium batteries use electrolytes including combustible organic solvents, and therefore, installing safety devices that suppress temperature increases in short circuits, improving structures for short circuit prevention, and improving materials for the structural improvement may be required. Accordingly, all solid batteries that do not use combustible organic solvents in the battery structure have been considered to provide simplified safety devices and improved productivity.

Electrodes of all solid lithium batteries typically use a mixture of solid electrolyte materials to increase the conductivity of lithium ions. For example, in the related art, a solid electrolyte lithium secondary battery has been provided by laminating an anode electrode in which an anode clad sheet layer containing anode active material powder and solid electrolyte powder, a solid electrolyte layer (SE), and a cathode electrode sequentially on both sides of a plate-shaped anode current collector. Therefore, a solid electrolyte having high adhesion between an anode and a cathode electrode may be provided within the battery, and the bending or cracks of batteries due to the expansion and the contraction of the anode and the cathode electrode accompanied with charge and discharge may be reduced.

Many solid lithium batteries may be one of the next generation batteries which require substantially high capacity and high output. In one example, an electrode active material layer may be thickened to obtain the higher capacity. However, the output property may be deteriorated due to the resistance increase by the thickening.

Figure 1:
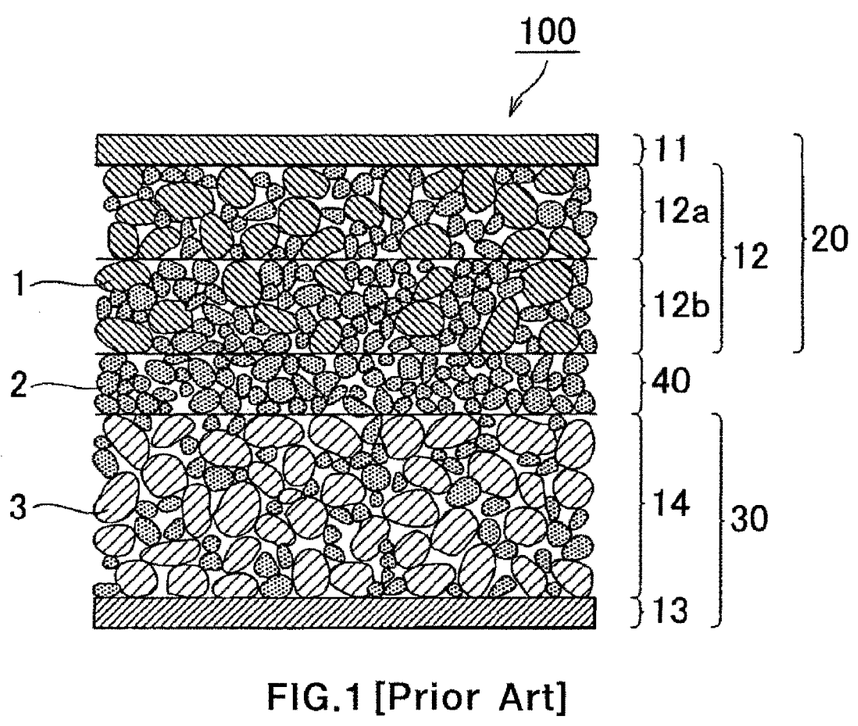
FIG. 1 schematically illustrates an exemplary all solid electrode in the related art.

Meanwhile, in the related art, a solid battery has been developed to improve an output property by reducing the diffusion resistance of lithium ions with a composition distribution, in which an active material volume ratio increases as being closer to a solid electrolyte interface based on the thickness direction. For example, as shown in FIG. 1, an electrode in which an anode active material layer is divided into two sections and an anode active material layer 2 has a higher solid electrolyte ratio than an anode active material layer 1. In this example, the process of preparing an electrode having different material ratios may go through several steps to increase electrode density, such as a rolling process which may be performed after coating each layer having different material ratios, and the rolling process may then be repeated. Particularly, the layers may be limited to a layer having a high anode material ratio and a layer having a high solid electrolyte material ratio when two layers are formed. In addition, continuous concentration change may be applied to the layers, but specific examples or preparation method implications have not been provided as far.

The above information disclosed in this Background section is merely for enhancement of understanding of the background of the invention and therefore it may contain information that does not form the prior art that is already known in this country to a person of ordinary skill in the art.

SUMMARY

The present invention provides technical solutions to the above-described technical difficulties in the related art. Accordingly, the present invention provides a method of manufacturing an electrode having a structure that improves an output property of an all solid battery. In particular, the method may include an aerosol deposition method.

In one aspect, the present invention provides a method of manufacturing an electrode of an all solid battery. The all solid battery may be formed by laminating: a cathode current collector; a cathode active material layer; a solid electrolyte layer; an anode active material layer; and an anode current collector. The cathode active material layer may include a cathode active material, a solid electrolyte and a conductor; and the anode active material layer may include an anode active material and a solid electrolyte. Particularly, in the cathode active material layer, the concentration of the cathode active material closer to the cathode current collector may be greater than the concentration of the cathode active material closer to the solid electrolyte layer. Further, in the anode active material layer, the concentration of the anode active material closer to the anode current collector may be greater than the concentration of the anode active material closer to the solid electrolyte layer. As such, the concentration level of each anode or cathode active material may be in a continuous gradient.

In certain exemplary embodiments, the active material may be introduced by being injected while the concentration level is controlled by adjusting a flow rate in one or more aerosol tanks having different concentrations of the active material. In addition, an active material volume ratio (Vra) which may be represented in following equation may be in a range from about 0.1 to about 0.5 in the solid electrolyte interface, and in a range from about 0.5 to about 0.9 in the current collector interface.

$$\text{Active material volume ratio } (Vra) = \frac{\text{active material volume}}{(\text{active material volume} + \text{solid electrolyte volume})}$$

BRIEF DESCRIPTION OF THE DRAWINGS

The above and other features of the present invention will now be described in detail with reference to exemplary embodiments thereof illustrated in the accompanying drawings which are given hereinbelow by way of illustration only, and thus are not limitative of the present invention, and wherein.

Reference numerals set forth in the FIG. 1 include reference to the following elements as further discussed below:

100: all solid battery
1: anode material
2: solid electrolyte material
3: cathode material
11, 13: current collector
12: anode active material layer
14: cathode active material layer
20: anode
30: cathode
40: solid electrolyte
12a: active material layer having high anode material ratio
12b acme material layer having high solid electrolyte material ratio It should be understood that the appended drawings are not necessarily to scale, presenting a somewhat simplified representation of various exemplary features illustrative of the basic principles of the invention. The specific design features of the present invention as disclosed herein, including, for example, specific dimensions, orientations, locations, and shapes will be determined in part by the particular intended application and use environment. In the figures, reference numbers refer to the same or equivalent parts of the present invention throughout the several figures of the drawing.

DETAILED DESCRIPTION

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

Hereinafter reference will now be made in detail to various exemplary embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The present invention provides a novel process which is capable of having substantially continuous concentration changes to have a greater electrode material ratio in a layer close to a solid electrolyte for high capacity of an active material.

In one aspect, the present invention provides a method of manufacturing an electrode of an all solid battery. The all solid battery may be formed by laminating a cathode current collector; a cathode active material layer; a solid electrolyte layer; an anode active material; layer, and an anode current collector. The cathode active material layer may include a cathode active material, a solid electrolyte and a conductor; and the anode active material layer may include an anode active material and a solid electrolyte. In particular, in the cathode active material layer, the concentration of the cathode active material closer to the cathode current collector may be greater than the concentration of the cathode active material closer to the solid electrolyte layer. Further, in the anode active material layer, the concentration of the anode active material closer to the anode current collector may be greater than the concentration of the anode active material closer to the solid electrolyte layer. Accordingly, the concentration level of each anode or cathode active material may be in a continuous gradient.

In certain exemplary embodiments, the active material may be introduced by being injected while the concentration level is controlled by adjusting a flow rate in one or more aerosol tanks having different concentrations of each active material. In addition, the active material volume ratio (Vra) may be obtained by the equation as follow.

$$\text{Active material volume ratio } (Vra) = \frac{\text{active material volume}}{(\text{active material volume} + \text{solid electrolyte volume})}$$

In certain exemplary embodiments, the active material volume ratio (Vra) may be in a range from about 0.1 to about 0.5 in the solid electrolyte interface, and may be in a range from about 0.5 to about 0.9 in the current collector interface.

Moreover, the active material and the solid electrolyte may be included in a volume ratio of about 1:1 to 3:7 in an aerosol tank having a first generator, and the active material and the solid electrolyte may be included in a volume ratio of 7:3 in an aerosol tank having a second generator. In particular, the preparation method may include: increasing the flow rate of the first generator coated on the solid electrolyte surface; maintaining the flow rate of the first generator; increasing the flow rate of the second generator while decreasing the flow rate of the first generator until the flow rate becomes about 0; and maintaining the flow rate of the second generator.

Alternatively, only the solid electrolyte may be included in an aerosol tank having a first generator, and the active material and the solid electrolyte may be included in a volume ratio of about 7:3 in an aerosol tank having a second generator. In particular, the preparation method may include: preparing the solid electrolyte layer by increasing the flow rate of the first generator; increasing the flow rate of the second generator while decreasing the flow rate of the first generator until the flow rate becomes about 0; and maintaining the flow rate of the second generator.

Figure 2:
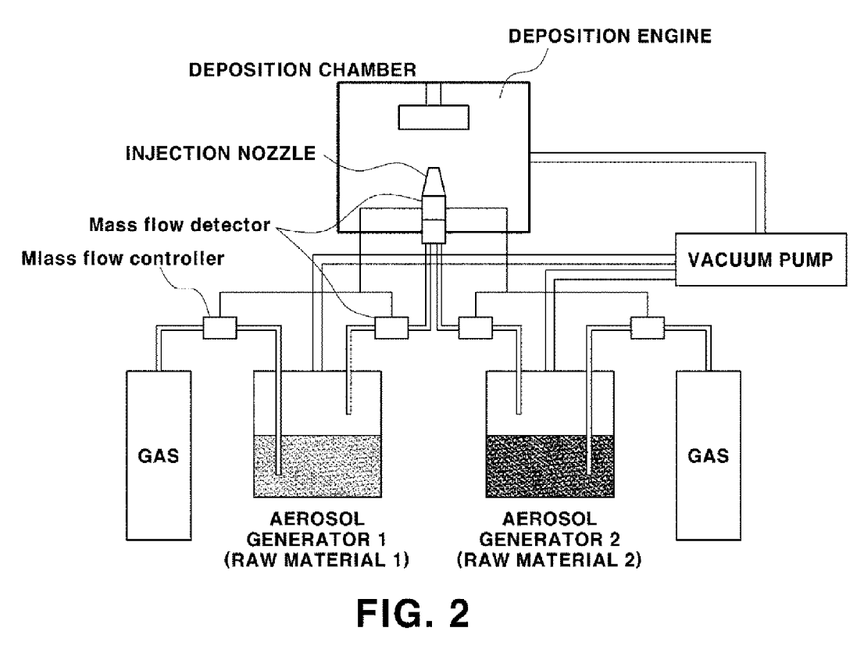
FIG. 2 schematically illustrates an exemplary plurality of aerosols for manufacturing an all solid electrode having a concentration gradient according to an exemplary embodiment of the present invention.

Typically, aerosol deposition methods have been used to coat one composition material. As shown in FIG. 2, to manufacture an electrode having a concentration gradient according to exemplary embodiments of the present invention, raw material tanks, for example, aerosol generator 1 and aerosol generator 2, having two or more compositions of material compositions in different concentrations may be prepared. In certain exemplary embodiments, the composition having different compositions from each other may be mixed and deposited by adjusting the flow of each aerosol generated from each aerosol generator. In addition, the slope of the concentration may change or gradient in concentration may be adjusted by the flow adjustment without limitation.

Figure 3:
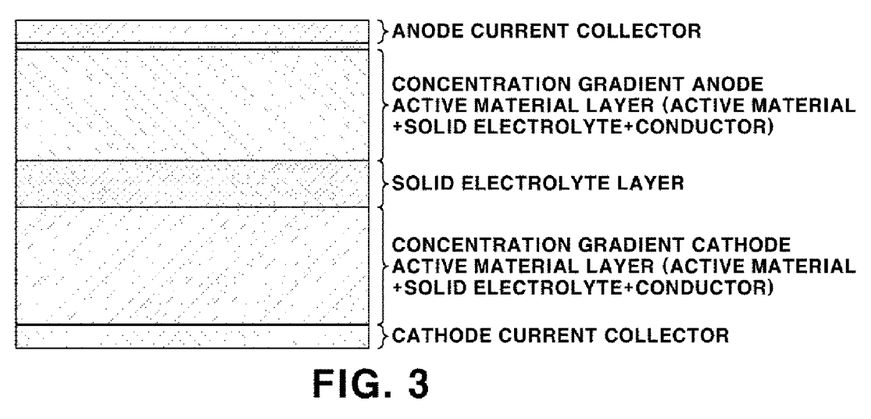
FIG. 3 schematically illustrates an exemplary all solid battery electrode having a concentration gradient according to an exemplary embodiment of the present invention.

As shown in FIG. 3, an output performance and high capacity may be obtained by adjusting the active material/solid electrolyte ratio in the cathode active material layer to have a concentration gradient. An output performance may be improved by disposing the solid electrolyte ratio in the solid electrolyte interface to be greater than the current collector interface, thereby facilitating ion diffusion. Moreover, high capacity of a battery may be obtained by disposing the active material ratio to be greater as the electrode is closer to the current collector interface.

According to certain exemplary embodiments of the present invention, the cathode or the anode electrode structure having a continuous concentration gradient may be manufactured in a single process through an aerosol deposition. The method of manufacturing of the present invention may include a process of preparing two aerosol tanks with different concentrations; and adjusting the flow rate injected from each tank, to obtain a substantially continuous concentration gradient when coating is applied.

Figure 4:
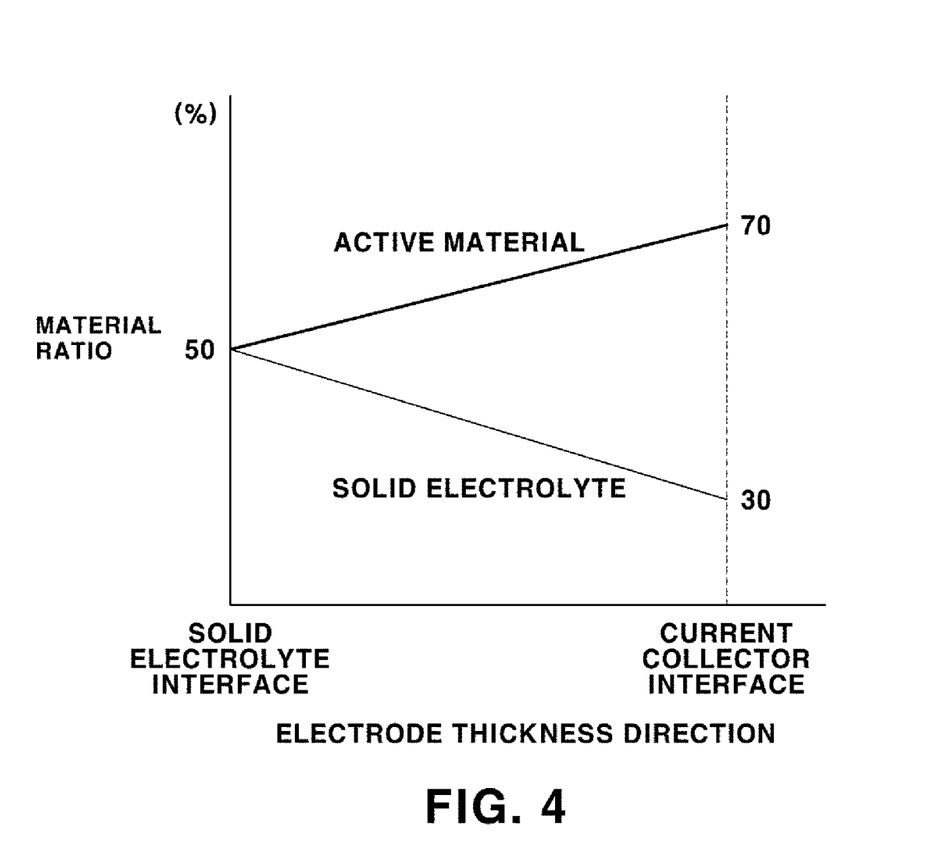
FIG. 4 is an exemplary graph showing a concentration gradient of an exemplary electrode according to an exemplary embodiment of the present invention.

Furthermore, the active material volume ratio (Vra) may be in a range of about 0.1 to 0.5 when the active material is in the solid electrolyte interface, and be in a range of about 0.5 to 0.9 when the active material is in the current collector interface. As shown in FIG. 4, the concentration changes may have a linear or curved form without limitation.

In certain exemplary embodiments, a total of 3 aerosol generators may be used and the anode active material layer, the solid electrolyte layer, and the cathode active material layer may be applied in a single process. For example, in an exemplary method, an aerosol generator 1 including cathode active material/solid electrolyte, an aerosol generator 2 including solid electrolyte, and an aerosol generator 3 including anode active material/solid electrolyte may be used to apply the active material layers.

Figure 5:
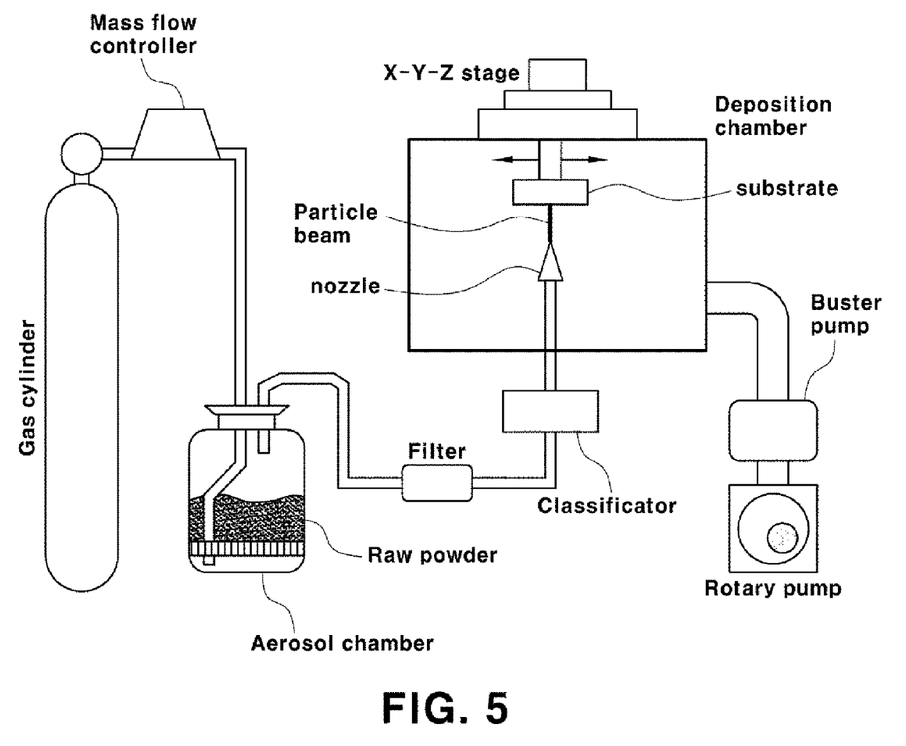
FIG. 5 shows an exemplary aerosol device according to an exemplary embodiment of the present invention.

An aerosol deposition method (ADM) is a process capable of forming a thick film with high density by impacting sub-micrometer-sized raw material powder on a substrate at a substantially high speed through a nozzle as illustrated in FIG. 5. Since the method was proposed by Dr. Akedo of Japan in late 1990s, there has been much progress in this technology. Particularly, the method may have advantages to provide a coating method in that a thick film with high density having crystalline structure properties at room temperature may be formed; coating may be performed on various substrates using powder of raw materials such as metal, ceramics and polymers; and a stoichiometric ratio of raw material powder may be maintained as applied in a thick film (e.g., of a predetermined thickness). Accordingly, the method has been used as a new coating technology having many advantages compared to existing spraying processes.

In another aspect, the constitution of the device is provided, as described in FIG. 5. The device may include a chamber in which deposition is progressed, and an aerosol generator, and a vacuum pump installed to maintain a vacuum of a few to tens of torrs when a film is formed. Additionally, raw material powders may be aerosolized when the deposition chamber and the aerosol generator containing the raw material powders are under vacuum using a vacuum pump, and then physical vibration may be applied simultaneously as transport gas such as helium and nitrogen are discharged to the aerosol generator. Aerosol, as used herein, refers to a state in which powder particles float in the atmosphere such as cigarette smoke and aerosolized particles may be accelerated to the chamber due to the pressure differences generated between the main chamber and the aerosol generator. When the aerosol particles are sprayed on the substrate through the nozzle within the deposition chamber, the spraying speed of the aerosol particles may reach approximately about 200 to about 400 msec, and the speed of film formation may reach a few µm/min. Therefore, the field of application may cover electronic ceramics, structural ceramics and the like.

EXAMPLES

Figure 6:
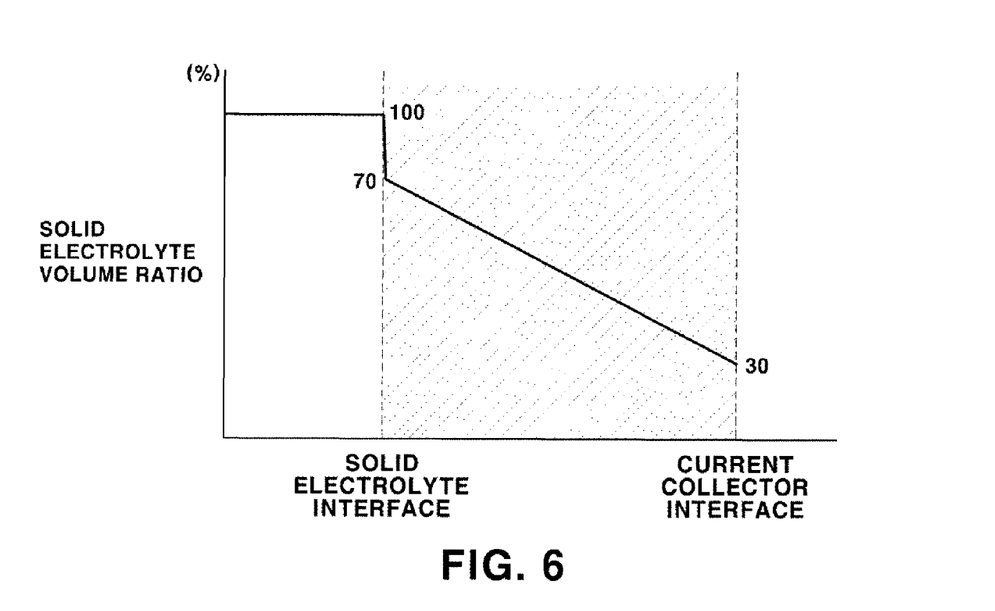
FIG. 6 to FIG. 9 are exemplary graphs showing concentration gradients of electrodes in Examples and Comparative Examples of the present invention.

Example 1 (FIG. 6)

A cathode active material ($LiCoO_2$), an anode active material (graphite), and a solid electrolyte (sulfide-based $Li_2S$—$P_2S_5$) were prepared. To coat each of both electrodes with the active material layer having a concentration gradient, an aerosol generator 1 was filled with a composition active material and solid electrolyte in a ratio of about 30:70 (v/v) and aerosol generator 2 is filled with a composition of active material and solid electrolyte in a ratio of about 70:30 (v/v). When the aerosol coating was applied on the solid electrolyte electrode surface, only the flow of the generator 1 was generated initially, and the flow of the generator 2 was increased while gradually decreasing the flow of the generator 1. Afterwards, the flow of the generator 1 was stopped, and only the flow of the generator 2 was maintained. Thus, an electrode in which a composition having the initial active material ratio of about 30 v/v % on the solid electrolyte interface changed to about 70 v/v % on the current collector interface was obtained. The active material volume ratio of the whole electrode was about 50%.

Figure 7:
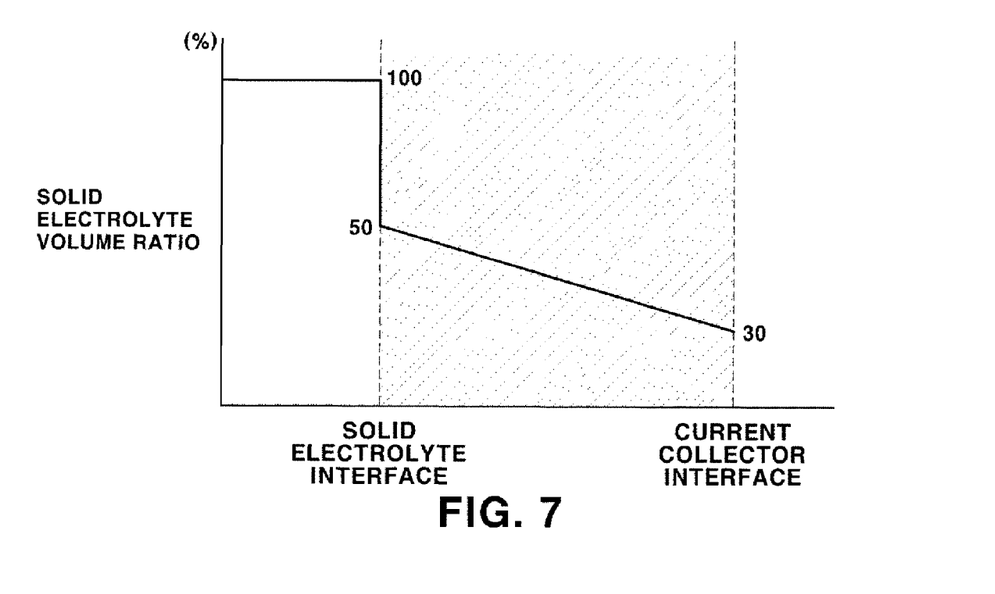

Example 2 (FIG. 7)

A cathode active material ($LiCoO_2$), an anode active material (graphite), and a solid electrolyte (sulfide-based $Li_2S$—$P_2S_5$) were prepared. To coat each of both electrodes with the active material layer having a concentration gradient, an aerosol generator 1 was filled with a composition of active material and solid electrolyte in a ratio of about 50:50 (v/v) and an aerosol generator 2 was filled with a composition of active material and solid electrolyte in a ratio of about 70:30 (v/v). When the aerosol coating was applied on the solid electrolyte electrode surface, only the flow of the generator 1 was generated initially, and the flow of the generator 2 was increased while gradually decreasing the flow of the generator 1. Afterwards, the flow of the generator 1 was stopped, and only the flow of the generator 2 was maintained. Thus, an electrode in which a composition having the initial active material ratio of about 50 v/v % on the solid electrolyte interface changed to 70 v/v % on the current collector interface was obtained. The active material volume ratio of the whole electrode was about 60%.

Figure 8:
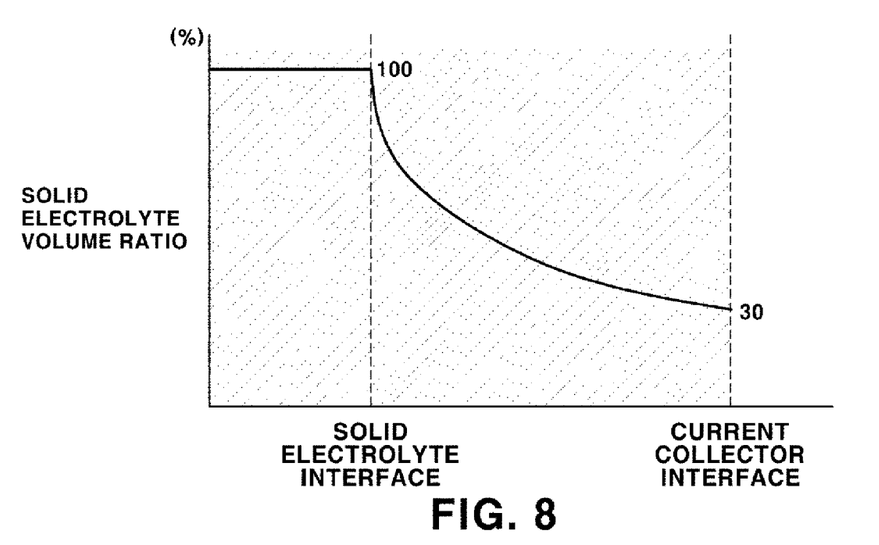

Example 3 (FIG. 8)

A cathode active material ($LiCoO_2$), an anode active material (graphite), and a solid electrolyte (sulfide-based $Li_2S$—$P_2S_5$) were prepared. To coat the solid electrolyte layer and the each of both electrodes with the active material layer having a concentration gradient, an aerosol generator 1 was filled with a composition of active material and solid electrolyte in a ratio of about 0:100 (v/v) and an aerosol generator 2 was filled with a composition of active material and solid electrolyte in a ratio of about 70:30 (v/v). The solid electrolyte layer was prepared by generating the flow of the aerosol generator 1 thereby manufacturing the solid electrolyte layer. Subsequently, the coating was applied while increasing the flow of the generator 2 and decreasing the flow of the generator 1. At the end, the flow of the generator 1 was stopped, and only the flow of the generator 2 was maintained, thereby manufacturing each of both electrodes having the concentration gradient of active material layer. The active material volume ratio of the whole electrode was about 55%.

Figure 9:
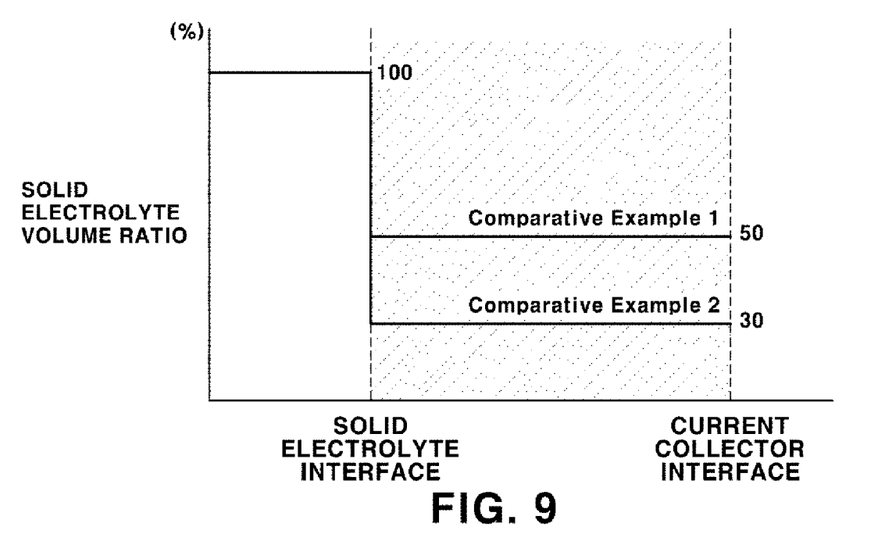

Comparative Example 1 (FIG. 9)

To coat each electrode with the active material layer having no concentration gradient, an aerosol generator 1 was filled with a composition of active material and solid electrolyte in a ratio of about 70:30 was filled and the aerosol coating was applied on the solid electrolyte electrode surface.

Comparative Example 2 (FIG. 9)

To coat each electrode with the active material layer having no concentration gradient, an aerosol generator 1 was filled with a composition of active material and solid electrolyte in a ratio of about 50:50 (v/v) and then the aerosol coating was applied on the solid electrolyte electrode surface.

Materials used in the comparative examples were a cathode active material ($LiCoO_2$), an anode active material (graphite) and a solid electrolyte (sulfide-based $Li_2S$—$P_2S_5$).

The battery output comparison results are shown in the following Table 1.

TABLE 1

| Clad | Discharge Capacity (mAh/g) | | | | |
|---|---|---|---|---|---|
| sheet ratio | Comparative Example 1 | Comparative Example 2 | Example 1 | Example 2 | Example 3 |
| 0.1 | 55 | 83 | 106 | 80 | 99 |
| 0.5 | 24 | 64 | 85 | 61 | 76 |
| 2 | 9 | 30 | 58 | 27 | 47 |
| 5 | 2 | 10 | 36 | 8 | 26 |

Example 1 shows improved output performance compared to Comparative Example 2 having an identical clad sheet ratio.

Example 2 shows similar output performance even at an electrode ratio about 20% higher (high capacity) compared to Comparative Example 2.

Example 3 shows improved performance compared to the Comparative Examples.

The present invention relates to an all solid electrode structure having a solid electrolyte concentration gradient, and provides a method of improving an output performance due to improved ion diffusion and obtaining a high capacity battery, by disposing an anode or cathode electrode having a continuous concentration gradient to have a greater solid electrolyte ratio as being closer to a solid electrolyte interface and have a greater active material ratio as being close to a current collector interface so that the active material/solid electrolyte ratio of anode and cathode active material layers has a concentration gradient by a single process using an aerosol deposition method.

What is claimed is:

1. A method of manufacturing an electrode of an all solid battery formed by laminating a cathode current collector; a cathode active material layer; a solid electrolyte layer; an anode active material layer; and an anode current collector,
wherein the cathode active material layer includes a cathode active material, a solid electrolyte and a conductor, and the anode active material layer includes an anode active material and a solid electrolyte,
wherein the concentration of the cathode active material closer to the cathode current collector is greater than the concentration of the cathode active material closer to the solid electrolyte layer in the cathode active material layer, the concentration of the anode active material closer to the anode current collector is greater than the concentration of the anode active material closer to the solid electrolyte layer in the anode active material layer, and each concentration level of the cathode active material layer or the anode active material layer has a substantially continuous gradient
wherein the active material is introduced by being injected while the concentration level is controlled by adjusting a flow rate in an aerosol tank having a first generator and another aerosol tank having a second generator such that the aerosol tanks have different concentrations of the active material,
wherein the adjusting a flow rate in the aerosol tanks comprises:
increasing a flow rate of the first generator coated on the solid electrolyte surface;
maintaining the flow rate of the first generator;
increasing a flow rate of the second generator while decreasing the flow rate of the first generator until the flow rate becomes about 0; and
maintaining the flow rate of the second generator.

2. The method of claim 1, wherein an active material volume ratio (Vra) is in a range from about 0.1 to about 0.5 in the solid electrolyte interface, and is in a range from about 0.5 to about 0.9 in the current collector interface,
wherein the active material volume ratio is obtained as follows:
the active material volume ratio $$(Vra) = \frac{\text{active material volume}}{(\text{active material volume} + \text{solid electrolyte volume})}.$$

3. The method of claim 1, wherein the active material and the solid electrolyte are included in a volume ratio of about 1:1 to 3:7 in the aerosol tank having a first generator, and the active material and the solid electrolyte are included in a volume ratio of about 7:3 in the aerosol tank having a second generator.

4. The method of claim 1, wherein only the solid electrolyte is included in the aerosol tank having a first generator, and the active material and the solid electrolyte are included in a volume ratio of about 7:3 in the aerosol tank having a second generator.

* * * * *